Jan. 4, 1966   L. G. FOWLER   3,227,274
SEPARATOR FOR COTTON HARVESTING APPARATUS
Filed Nov. 12, 1963   5 Sheets-Sheet 2
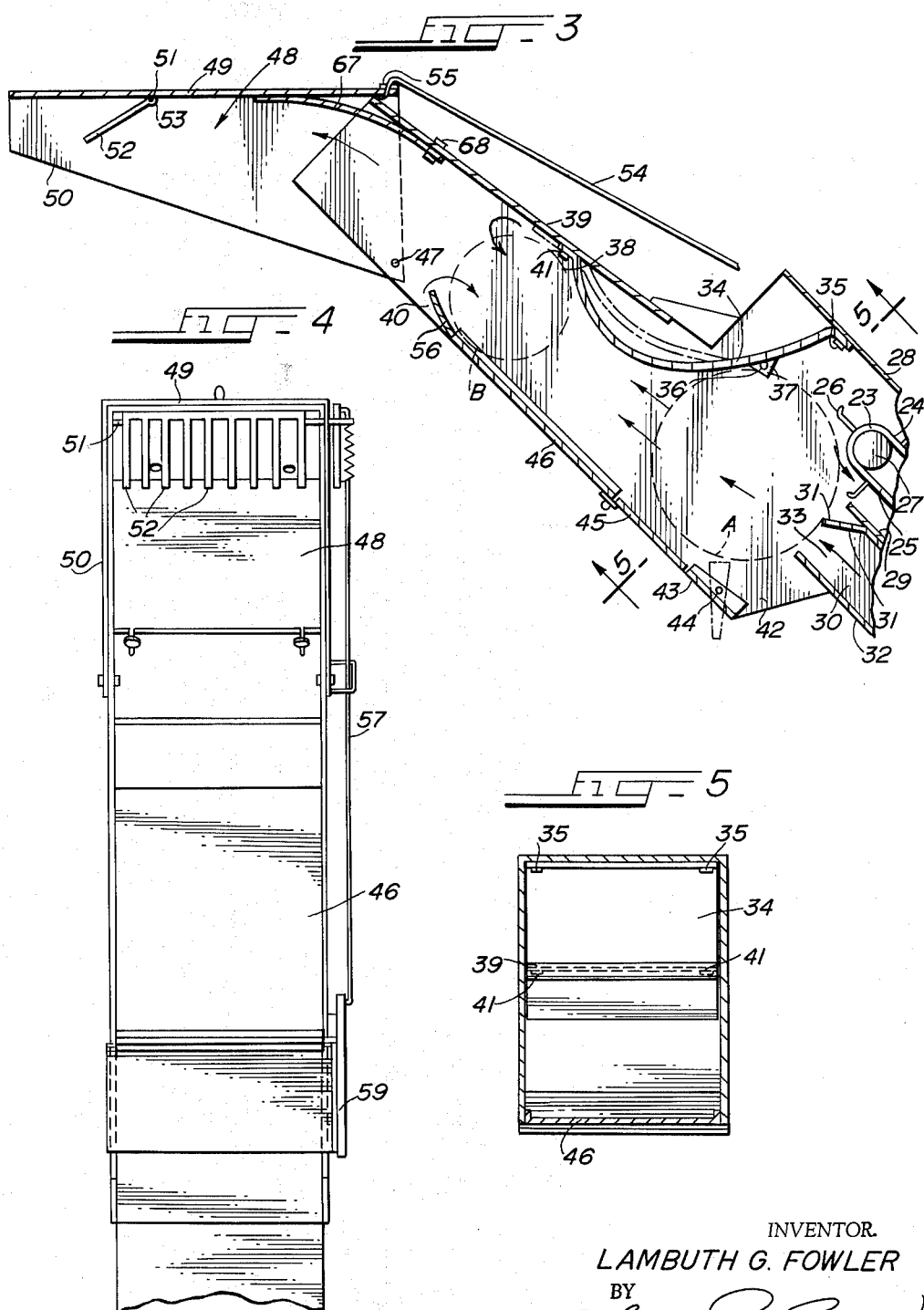
INVENTOR.
LAMBUTH G. FOWLER

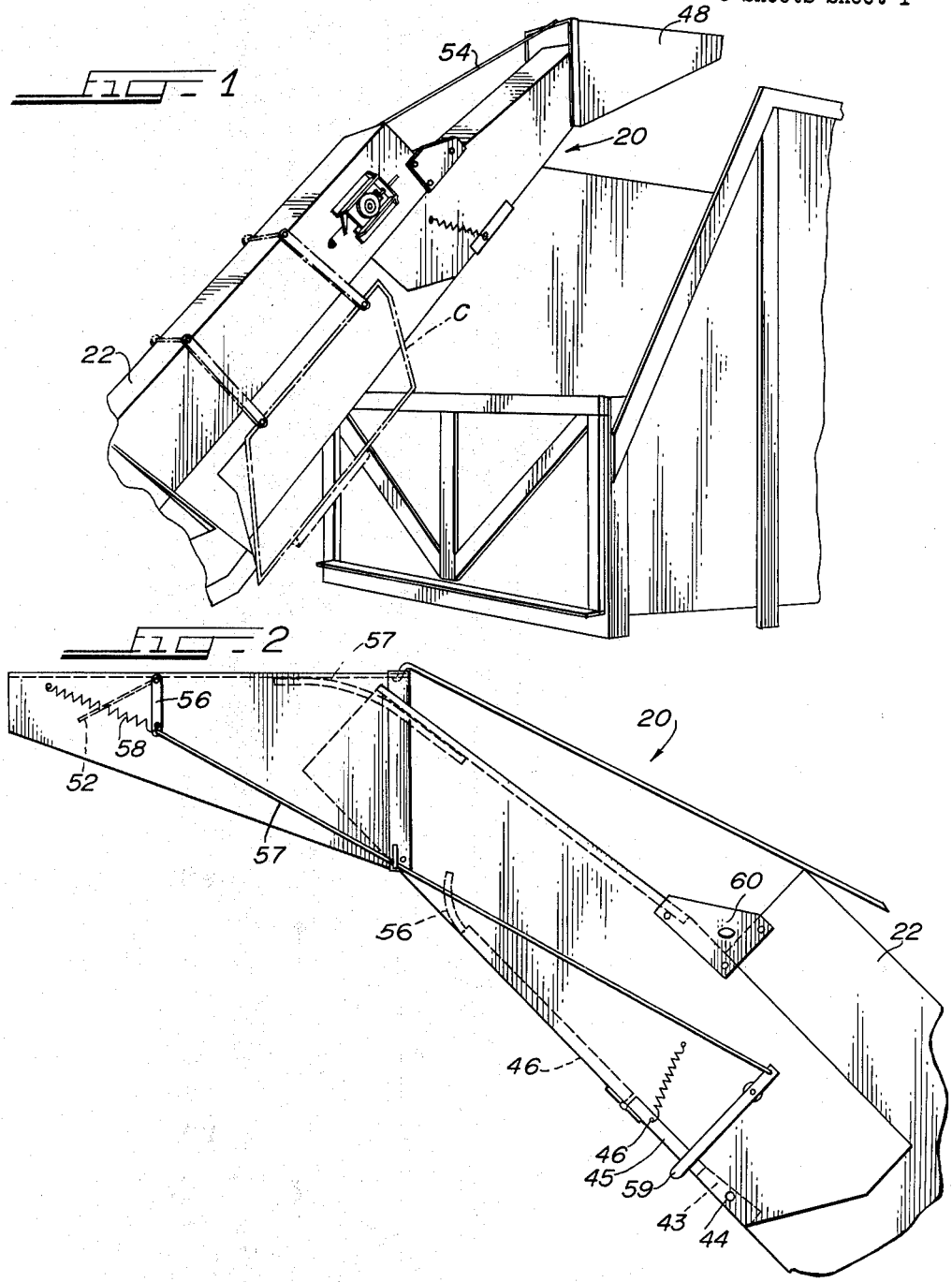

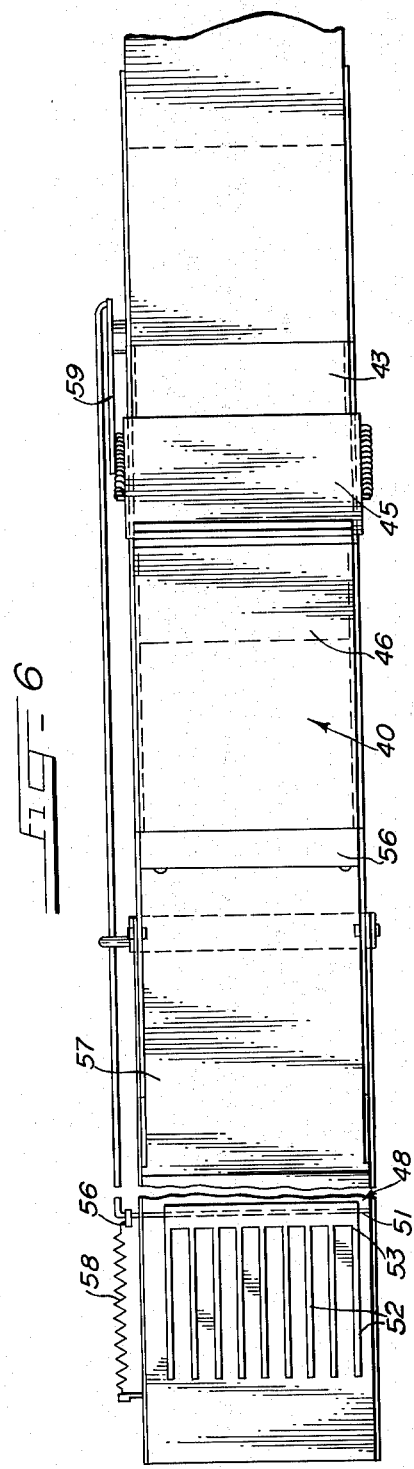

Jan. 4, 1966    L. G. FOWLER    3,227,274
SEPARATOR FOR COTTON HARVESTING APPARATUS
Filed Nov. 12, 1963    5 Sheets-Sheet 4
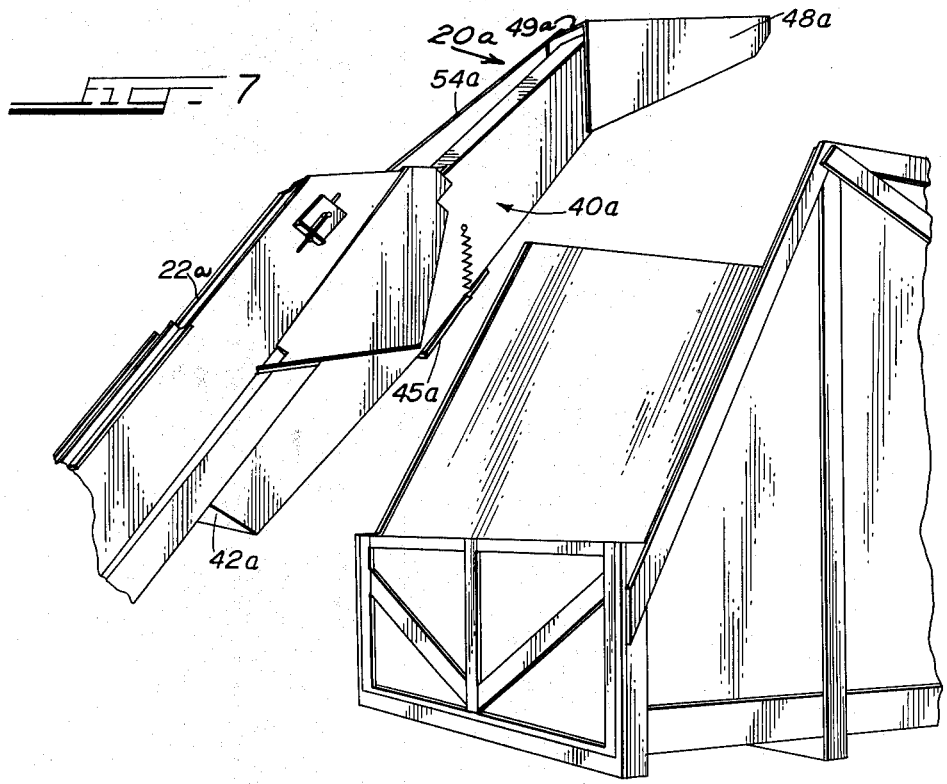
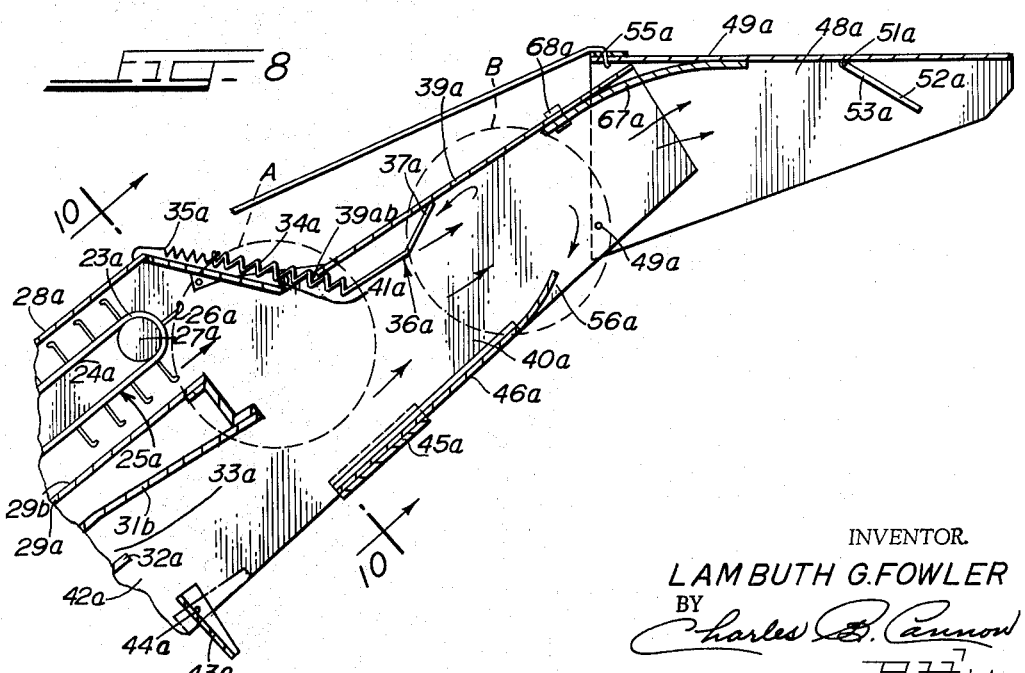
INVENTOR.
LAMBUTH G. FOWLER
BY
Charles B. Cannon
ATTY.

Jan. 4, 1966 L. G. FOWLER 3,227,274
SEPARATOR FOR COTTON HARVESTING APPARATUS
Filed Nov. 12, 1963 5 Sheets-Sheet 5
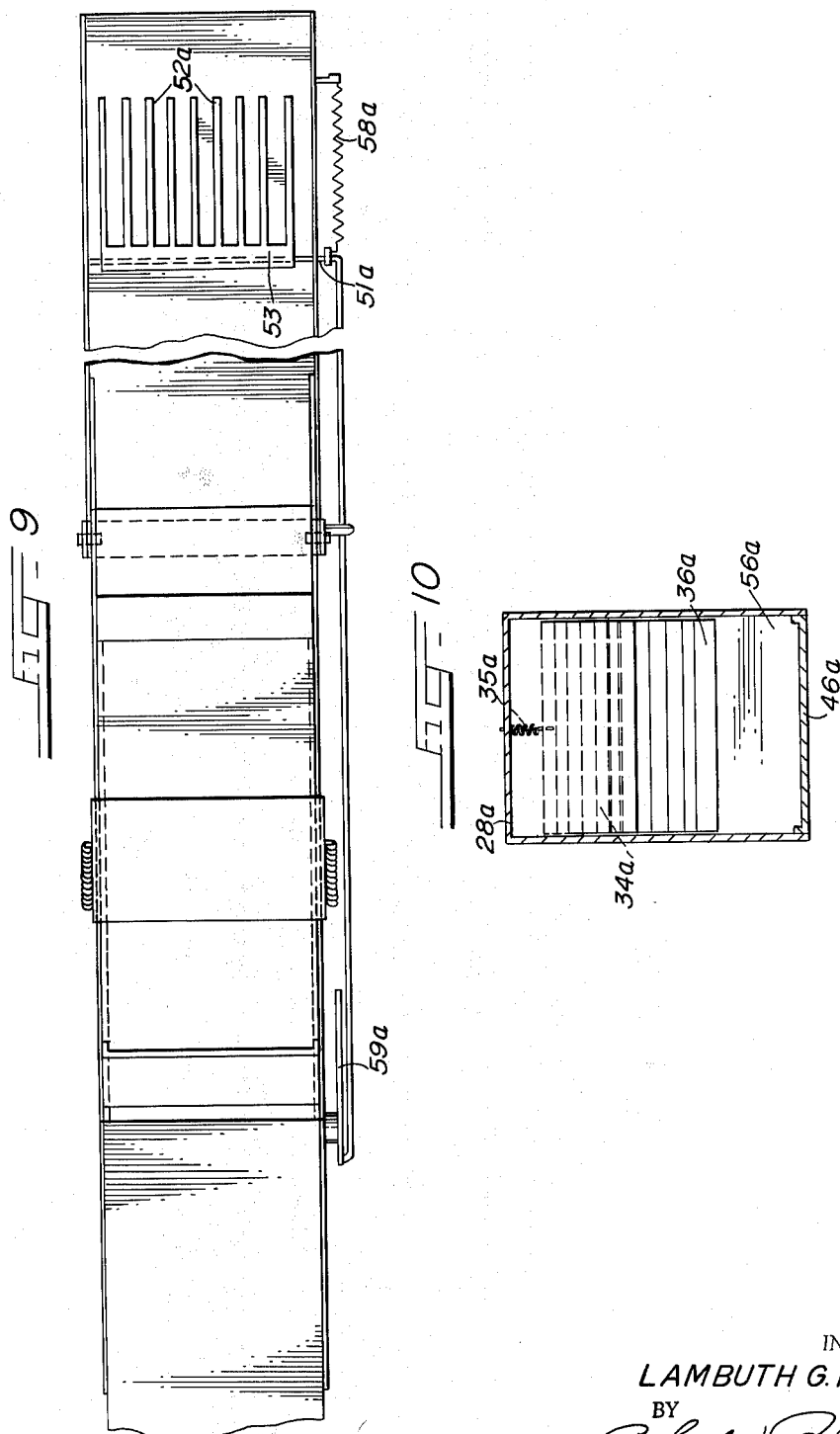
INVENTOR.
LAMBUTH G. FOWLER United States Patent Office 3,227,274
Patented Jan. 4, 1966

3,227,274
SEPARATOR FOR COTTON HARVESTING
APPARATUS
Lambuth G. Fowler, 3511 46th St., Lubbock, Tex.
Filed Nov. 12, 1963, Ser. No. 323,865
11 Claims. (Cl. 209—119)

This invention relates to an agricultural machine, and particularly to an apparatus which serves as an extension to a typical elevator apparatus, mounted on a cotton picking machine, and serves not only to extend the height of the discharge end further above ground level, but also to separate impurities entrained in said freshly picked cotton in a novel and highly effective manner.

In general, it has been known that an effective method of transporting freshly harvested cotton from the cotton plant to a trailer or a wagon, has been to receive the cotton taken by the picker or stripper and mechanically elevate it by means of a conveyor to a heightened and relatively rearward position, and thence to deposit it into a wagon or trailer, by means of entraining the cotton in an air stream which is provided, and which blows parallel to the conveyor axis, the air stream and the cotton then being directed by means of an adjustable duct to the intended place of deposit. Such means of transporting cotton from the cotton picker or stripper to the trailer are described, for example, in my earlier Patent No. 2,645,821 issued July 21, 1952. Such means as those described in my earlier Patent No. 2,645,821 were effective to a certain extent, and provided a rudimentary separation of many impurities. However, the known devices of the prior art have had a number of shortcomings and as a consequence there has been a definite and long standing need for a device which would combine sufficient desirable features and result in an apparatus which would provide a means for raising the discharge point to a relatively great height for loading an extremely large trailer from front to rear, and to a high heaping load, with a minimum of manual labor, and having a maximum of capacity for separating impurities of all types.

For example, it is possible to raise the effective height of the discharge end of a cotton elevator by lengthening the conveyor unit, or by increasing the velocity of volume of an air stream designed to entrain the cotton as it leaves the conveyor. Although such a device as the one to which I have referred has the advantage of a raised discharge point, if it employs a high velocity air stream, it will have the inherently associated disadvantage of entraining a large proportion of relatively less dense impurities. Devices of the prior art, utilizing a high velocity air stream, have had a further disadvantage inherent therein, which resides in the fact that when the upper duct or baffle adjacent the discharge end is directed downwardly at the cotton resting in the trailer when the trailer is nearly full, such a high air velocity will undesirably blow the cotton in the trailer out of the trailer, causing considerable waste and generally ineffctive loading.

Because of the desirability of harvesting cotton in a short period of time when conditions are relatively ideal therefor, a common practice is to use relatively large cotton trailers and because of standard manufacture, road tax conditions and the like, the vast majority of cotton trailers now in use in large scale operations are eight feet wide, eight feet high and twenty feet long. Because of labor costs, and the uncertainty of obtaining laborers when conditions are best for harvesting cotton crops, it is desirable and economically advantageous to attempt to fill a large trailer, such as that described, completely and effectively with the aid of not more than one laborer, and, at the same time, to achieve a highly effective separation of impurities of varying densities from the cotton. As referred to herein, the expression "relatively dense" will be used to describe impurities of a character such as rocks, clods of earth and the like, and the expression "relatively less dense" will be used to describe impurities such as green cotton bolls, and unopened, but moderately dry or frozen cotton bolls, which although valuable when opened later, are not desirably included in with the fully ripe cotton.

Accordingly, it is an object of the present invention to provide an elevator extension and separator structure which is capable of raising the discharge point of a cotton stripper to a substantially higher position.

It is a further object of the present invention to provide an elevator extension and separation apparatus which makes possible a novel and highly effective two-stage separation of the impurities from cotton.

It is a further object of the present invention to provide an elevator extension and separation apparatus which makes possible much more effective wagon loading procedure.

It is a further object of the present invention to provide an elevator extension and separator apparatus which makes possible a highly efficient separation of impurities from cotton with a minimum labor requirement.

It is a further object of the invention to provide a novel elevator extension and separator apparatus which makes it possible to load an ordinary cotton trailer fully and completely with a minimum requirement for help in the form of human labor.

It is a further object of the present invention to provide a novel elevator extension and separator apparatus which includes means for causing the cotton entrained in the air flow to be separated from the direction of the air flow.

It is a further object of the invention to obtain, when desired, the advantages of a higher discharge point without the use of a substantially higher air stream velocity.

It is a further object of the invention to provide a novel elevator extension and separator apparatus which, when using a higher air velocity, if so desired, will have none of the disadvantages associated with machines using such higher air velocities.

These and other objects of the invention will be more apparent when considered in conjunction with a description of the preferred embodiments of the invention, which incorporate the best mode of applying the principles of the invention, such embodiments being described in the specification and claims hereof and shown in the drawings in which:

FIG. 1 is a perspective view of an elevator extension and separator apparatus of the present invention shown in position of use;

FIG. 2 is a side elevational view of the elevator extension and separator apparatus of the present invention;

FIG. 3 is a vertical sectional view of one embodiment of the elevator extension and separator of the present invention;

FIG. 4 is a rear elevational view of the elevator extension and separator of the present invention;

FIG. 5 is a vertical sectional view of the duct and baffle structure of FIG. 3 taken along line 5—5 of FIG. 3;

FIG. 6 is a bottom plan view of the elevator extension and separator apparatus of the present invention;

FIG. 7 is a perspective view of a modification of the elevator extension and separator apparatus of the present invention;

FIG. 8 is a vertical sectional view of the elevator extension and separator apparatus of the present invention;

FIG. 9 is a bottom plan view of the modified apparatus of FIG. 7; and

FIG. 10 is a vertical sectional view of the baffle member and duct of the elevator and separator apparatus of FIG. 8 taken along line 10—10 of FIG. 8.

In general, the present invention comprises an elevator extension and separator apparatus shown generally at 20, and this apparatus is suitably received adjacent the discharge end of an elevator or conveyor apparatus of the prior art, shown generally at 22.

The present invention more particularly relates to an elevator extension 20, which is designed to be used in connection with the cotton elevator units 22 of the prior art replacing part of the duct work at the ends thereof with the apparatus of the present invention. The pertinent portions of the ordinary elevator unit 22 to which the device 20 of the present invention is attached, may be best seen in FIG. 3, where there is shown an endless conveyor belt 23 containing an upper run 24 and a lower run 25, and extending outwardly therefrom, a plurality of segments 26 adapted to receive and carry cotton bolls, but which also transport various impurities and the like. The upper run 24 is separated from the lower run 25 by means of a terminal roller 27 over which the belt 23 rides. The conveyor is shrouded by upper and lower duct wall members 28, 29, and, situated below the conveyor, is an air duct 30, comprising an upper wall portion 31 and a lower wall portion 32, through which an air stream is directed, and this air exits at a discharge opening 33 as shown. A directional arrow is shown associated with the conveyor unit in FIG. 3, and it will be noted that this conveyor is a so-called overshot conveyor, that is, the load is carried on the upper run thereof.

A curvilinear baffle plate 34 is fixedly attached, as by bolts 35, or the like, to the upper duct member 28 adjacent the top end thereof, and the baffle 34 is further located by a means in the form of a pin 36 extending through locating ears 37. The lower end 38 of the baffle 34 terminates adjacent the top surface 39 of the lower duct member 40, and is adjustably attached thereto by means of bolts 41. As shown in FIG. 3, the end portion 38 of the baffle 34 may be moved upwardly and downwardly along the top surface 39 of the lower duct 40, thus changing the contour of the curvilinear baffle 34 for reasons which will be more fully explained hereinafter.

The lower duct member 40 is provided with a bottom discharge opening 42, and a lower door 43 including a pivot point 44 associated therewith. An upper door 45 is also provided in the bottom wall portion 46 of the lower duct 40. Movement of the upper door 45 between an open and shut position can also be accomplished for reasons which will be further explained herein.

A pivot point 47 provides a means of attachment for the upper duct 48, and the upper duct 48 includes a top surface portion 49 and vertically extending side walls 50. A rod 51 through the side walls 50 provides a pivoting action for the fingers 52 which are the lower extensions of a movable base member 53. A central rod 54 extends from a point adjacent the tractor, or operator thereof (not shown) and terminates by engaging the top surface 49 of the upper duct 48 in an opening 55 formed in the forward end of the upper duct 48. As referred to herein, and in the appended claims, "upper" and "lower" refer to directions in the position of use of the elevator extension and separator device, and "forwardly" and "rearwardly," and the like, refer to the direction of travel of the machine and the trailer. Thus, the general movement of air and cotton during an operational cycle is from front to rear, i.e., from the front of the tractor to the rear and toward the trailer as such material passes through the separator and elevator apparatus.

Movement of the rod 51 and the base member 53 as an attachment means for the novel elevator unit 20 to FIG. 2, wherein an exterior bell crank arm 56 is shown pivotally connected to a central lever 57, the motion of which is opposed by locating spring 58. A movement of the lower central arm 59 will result in a change of the disposition of the fingers 52. A roughly triangular gusset 60 is shown (FIG. 2) to serve as a reinforcement and as an attachment means for the novel elevator unit 20 to the basic elevator structure 22.

The above described embodiment of the invention is designed for use with a particular brand of cotton picker or stripper and the mechanical conveyor and the air stream means associated therewith, namely, in this case, a John Deere elevator mechanism, and therefore, the above described embodiment includes a baffle 34 in the smooth arcuate or curvilinear form described therein. It is the purpose of this curved baffle to work in association with a so-called overshot type conveyor for reasons which will be further discussed hereinafter. Other embodiments will be more suitable for use with other brands of cotton strippers and, therefore, they will have a somewhat different baffle construction because they will be designed to be used with conveyors of the so-called undershot type, that is, conveyors in which the material is carried adjacent the lower run of the conveyor.

A second embodiment of the present invention is similar to the first embodiment in its basic mode of operation, but differs from the first embodiment insofar as certain construction features thereof are modified to operate more effectively with the type of conveyor mechanism used in the elevator device with which the present invention is adapted to be used, especially as to the mode of operation of the mechanical conveyor and the location of the ducts which guide the air stream which entrains the cotton material.

Insofar as the various components of the second embodiment resemble those of the first, they are referred to herein in describing second embodiment by the same numbers which they were given in describing the first embodiment, but these components will be distinguished therefrom by the inclusion of the additional and distinguishing reference character *a*.

A second embodiment of the invention comprises a modified elevator extension and separator apparatus and is best shown in FIG. 8. In FIG. 8 there is shown a conveyor system comprising an endless conveyor belt 23*a* an upper run 24*a*, a lower run 25*a*, and a plurality of outwardly extending cotton-carrying members 26*a* attached thereto. The upper run 24*a* is separated from the lower run 25*a* by means of a terminal pulley 27*a*. In the conveyor illustrated in FIG. 8, the lower run 25*a* carries the load, and, as a consequence, this type of conveyor is commonly referred to as an "undershot" conveyor. This conveyor is shrouded by an upper duct wall 28*a*, a lower duct wall 29*a* and an extension 29*b* thereof. An air duct 30*a* is located a substantial distance below the conveyor, and this air duct 30*a* comprises an upper wall portion 31*a*, an extension thereof 31*b*, and a lower wall portion 32*a*, and the air stream leaves the duct 30*a* at the opening 33*a*, as shown, and travels under the upper extension 31*b*. The extensions 29*b* and 31*b* are adapters which are desirably included for modifying the conveyor unit 22*a* of the prior art for use with the novel extension and separator unit 20*a*.

It will be noted that the elevator and separator apparatus illustrated in FIG. 8, differs particularly from the construction of the apparatus shown in FIG. 3, in the construction of the baffle plate 34*a*, which, in this case, is a corrugated or saw-toothed type flat plate. This baffle plate 34*a* is attached by means of an intermediate tension spring 35*a* to the upper conveyor duct wall 28*a*. This corrugated baffle 34*a* includes a lower end assembly comprising a flat plate 36*a* and an offset upwardly extending leg 37*a*, integrally formed therewith. It will thus be seen that the plate 36*a* is somewhat parallel to the direction of the air stream and forms a venturi in the lower duct member 40*a*, and the size of this venturi may be varied somewhat by displacing the corrugated baffle 34*a* to the right as shown in FIG. 8 against the tension of the retaining spring 35*a*. The offset leg 37*a* extends upwardly adjacent the top surface 39a of the lower duct 40a, thus providing a region of less constriction than that immediately below the plate member 36a, for reasons which will be further explained hereinafter.

A lower end portion 39ab of the top surface 39a engages one tooth of the corrugated baffle plate 34a, and a transversely extending rod 41a serves to help locate the baffle plate 34a by the cooperating action between the rod 41a and the lower end portion 39ab of the duct 40a. The plate 34a will thus be seen to be wedged in place by the downward force of projection 39ab and the upward force of projection 41a, as the baffle 34a is stretched downwardly against the force of the retaining spring 35a. The distance between the bottom plate surface 36a and the top duct surface 39a may be changed by exerting more or less force against the retaining spring 35a, moving the baffle plate 34a including the lower plate 36a thereof, relatively upwardly or downwardly and locking it in place by means of the projection 39ab and the rod 41a.

The remainder of the elevator and separator devices is substantially the same as the device shown in FIGS. 1 and 3, that is, it comprises a lower duct member 40a, a bottom discharge opening 42a, a lower door 43a including a pivot point 44a associated therewith. An upper door 45a is also provided in the bottom wall portion 46a of the lower duct 40a. Movement of the upper door 45a between an open and shut position can be accomplished for reasons which will be explained further herein.

The upper duct 48a may pivot about a pivot point 47a, thus allowing a pivoting motion of the upper duct 48a, which includes the top surface portion 49a and the vertically extending side walls 50a thereof.

A rod 41a extending through the side walls 50a of the upper duct 48a provides a pivoting action for the fingers 52a which are lower extensions of a movable base member 53a. A second rod 54a extends from a point adjacent the tractor or operator (not shown) and terminated by engaging the top surface 49a of the upper duct 48a in an opening 55a formed in the forward end of the upper duct 48a.

Movement of the rod 51a and the base member 53a associated therewith is best shown and understood by referring to FIG. 9 wherein an exterior bell crank arm 56a is shown pivotally connected to a second lever 57a, the motion of which is opposed by the locating spring 58a. A movement of the lower second arm 59a will result in a movement of the fingers 52a.

The novel elevator and separator device 20a of the present invention may be suitably attached to a known type of prior art elevator and conveyor apparatus 22a in any suitable manner.

The operation of the novel elevator extension and device may best be understood by reference to FIG. 3, with the understanding that the second embodiment of the invention shown, for example, in FIGS. 7 and 8 operates in substantially the same manner as the first embodiment, with the exception that the baffle plate 34a, the bottom plate 36a, and associated part of the baffle system thus formed, operate somewhat differently, although on the same principle. That is, both baffles deflect impurities downwardly but the corrugated plate 34 is more effective with an "undershot" conveyor and the smooth curved plate 34 is more effective with an "overshot" conveyor.

Referring now to FIG. 3, it will be seen that that material can be transported on the upper run of the conveyor 24 and that as pointed out, this material will include not only fully ripened cotton bolls but will also include impurities of varying densities, such as rocks, clods of earth, and unopened cotton bolls, which may be of various densities, depending on whether they are merely green and damp or are frozen and somewhat dried, but still unopened.

In the operation of the device such material will be launched from the upper run of the conveyor 24 and some of this relatively more dense material will follow the trajectory shown in the dotted lines in FIG. 3. Other material will not be deflected downwardly as shown by the dotted lines, but will be entrained in the air stream which is generally shown in the arrows in FIG. 3, that is, material comprising both cotton and impurities normally associated therewith, as referred to herein, will impinge on the baffle plate 34, and such material will be, by reason of the so-called overshot action of the conveyor, thrust somewhat downwardly and into the baffle plate 34 in a generally tangential relation. The air stream, as shown by the arrows, issues from the air duct opening 33 some distance below the baffle plate 34, and it will be appreciated that an air stream of suitable velocity directed through this opening 33 and through the lower duct 40 will entrain low density cotton bolls as they drop relatively slowly into the air stream. The cotton bolls strike the baffle plate 34 somewhat gently, and, because of their resilient character, do not rebound sharply from the baffle plate 34, but are deflected comparatively slowly or gently downwardly, whereupon they are entrained in the air stream shown by the arrows.

On the other hand, however, relatively more dense impurities, such as rocks and clods of soil, strike the baffle plate rather sharply and are deflected downwardly rapidly, and are not entrained or otherwise entrapped in the air stream from the opening 33.

It will thus be noted that one critical element in the combination which comprises the invention is the location and profile or shape of the baffle plate 34, which is designed so that the tangentially impinging impurities will be deflected downwardly and this plate must be placed correctly in order to obtain good results. If the plate is too close to the terminal roller 27, or if the plate face is relatively too perpendicular with respect to the conveyor axis, the impurities will return down the lower run of the conveyor 25 and the cotton bolls will be undesirably more or less suspended in the air above the air stream emerging from the outlets 33. In operation, a distance of about 16 inches between the roller 27 and the baffle 34 gives good results. If the baffle plate 34 is relatively too closely parallel to the conveyor axis, dirt and other material will not be deflected downwardly in sufficient proportions and will be entrained to a large extent in the air stream. The baffle plate must extend downwardly to a certain extent, however, for the further reasons which will be pointed out hereinafter, and the vertical dimension of the venturi formed under the baffle 34 in the duct 40 is about 18 inches.

The operation just described, namely, the separation of the relatively more dense impurities in the region of the front wall portion of the baffle plate, take place in what I refer to as the first separation zone and this region is generally shown circled by dotted lines and designated A.

A second separation zone, generally shown in the area circled with dotted lines and designated B is located further upwardly and rearwardly in the lower duct 40.

The air stream carrying the entrained cotton bolls and emerging from the opening 33 proceeds to the lower most extension of the curvilinear baffle plate 34 and where there is the greatest constriction, that is, in the region of least cross-sectional area, in the lower duct 40 where there is a low pressure and high velocity zone. Further upwardly and rearwardly, for example, under the rear portion 38 of the baffle plate 34, and in the area generally shown as zone B, there is an expansion chamber, and the air velocity slows considerably here and the flow thereof is somewhat turbulent, as shown by the arrows. At this point, the impurities which are too light to be separated in zone A, but which comprise unopened cotton bolls or other economically undesirable specimen of cotton are here separated. The turbulence referred to above with the resultant lowering of air velocity allows these still entrained, but undesirable, low density impurities to be separated from the more valuable cotton. A mechanical restriction to the further upward passage of these low density impurities is incorporated into the rear portion of the lower duct by means in the form of a curved retainer flange 56. The impurities thus separated in the second stage may roll down the bottom surface of the lower duct 40 and pass out through the opening such as, for example, the lower door 43, which may be swung downwardly about its pivot point 44. The upper door 45 may also be opened for the purpose of allowing the impurities to be deposited outside the lower duct 40. If the doors 43 and 45 are closed, all impurities will exit from the bottom opening 42 and if desired a so-called "boll-box" may be attached therebelow. Such a "boll-box" type collector device is shown in phantom lines in FIG. 1 and is designated by the letter C.

The valuable and desirable cotton which is still entrained on the air stream as it proceeds to the upper duct 48, may then be discharged to the rear substantially parallel to the top surface 49 of the duct 48. When it is desired to deflect the cotton downwardly without directing the full force of the air stream at the cotton already loaded in the trailer, the fingers 52 attached to the base member 53 may be rotated downwardly at a desired angle, for example, 45°. In this manner, the air stream proceeds substantially rearwardly, parallel to the upper surface 49 whereas the cotton is deflected downwardly into a desired position in the trailer or wagon.

The embodiment shown in FIG. 8 is substantially the same as that shown in FIGS. 1 and 3, except that the conveyor unit shown in FIG. 8 is a so-called undershot conveyor, operating in the directions shown by the arrows. To provide for a dropping space between the point of exit of the material from the conveyor to the air stream, shown in the arrows, the air duct 32a in the opening 33a therein, are disposed substantially below the lower run 25a.

Thus, the distance between the air outlets 33, 33a and the particular run of the conveyor (upper or lower) which is carrying the cotton will be substantially the same.

With the undershot conveyor, the cotton and the impurities are directed relatively more upwardly at the baffle plate 34a, and, it is desired to prevent unwanted deflection of such upwardly directed impurities, outwardly therefrom and down the upper run 24a of the conveyor. For this purpose, the corrugated construction has proved far superior in retaining the cotton in the air stream and at the same time deflecting the impurities rapidly downward to the bottom of the lower duct 40. The functions of the second separation zone B, namely, the venturi area under the plate member 36a, and the function of the expansion chamber behind the leg 37a, the door members 43a and 45a, the upper retainer flange 56a and removable fingers 52a are all substantially identical with the functions of their counterparts in the earlier embodiments.

Air flow characteristics and machine efficiency generally have been found to be improved by the addition of a transition surface plate 67, 67a, which is fixedly attached by bolts 68, 68a, or the like, to the top surface of the lower duct 39, 39a of the lower duct 40, 40a and which flexibly and slidably engages the top surface 49, 49a of the upper duct 48, 48a, thus providing a smoothly curved surface for the air flow, and eliminating the turbulence which would be caused by relatively angular bends between the two ducts 40, 48 and 40a and 48a.

It will thus be seen that the novel elevator extension and separator apparatus combines, for the first time, the advantages of (a) a high location of the discharge end, (b) the ability to perform a relatively fine separation of impurities, and (c) provides means for using a relatively rapid air stream without having any of the disadvantages previously associated therewith, and accomplishes all these and other advantages by means of a simple and inexpensive but ingenious construction.

It will thus be seen from the foregoing description, considered in conjunction with the accompanying drawings, that the present invention provides a new and improved elevator extension and separator apparatus and thus has desirable advantages and accomplishes its intended objects, including those hereinbefore pointed out and others which are inherent in the invention.

I claim:

1. A combination elevator extension and separator apparatus for transporting cotton from the conveyor discharge end of an agricultural machine into a trailer or the like and for separating undesirable impurities from cotton, said elevator extension and separator apparatus being adapted to be received at the discharge end of a cotton stripper, wherein said cotton stripper includes a mechanical conveyor means and a forced air stream means for entraining and transporting cotton material to a point of ultimate discharge, said elevator extension and separator apparatus comprising, in combination, (a) a first and lower duct means including a lower end, an upper end, central upper interior portion and a longitudinal central axis therethrough, said lower end being positionable below the discharge end of said conveyor and said air stream means such that said longitudinal central axis is offset downwardly from the longitudinal axis of said conveyor, (b) baffle means extending from a point adjacent the said discharge end downwardly into said central upper interior portion, and forming (1) a constriction in said first and lower duct immediately below said interior upper central portion and (2) a relatively less constricted region in said first and lower duct nearer the upper end of said first and lower duct, (c) a second and upper discharge duct pivotally mounted at the upper end of said lower duct, said upper and lower ducts being in communicating relationship with each other and (d) a cotton deflector means adjacent the discharge end of said upper duct and movably mounted therein, said cotton deflector means comprising (1) a pivotable base member and (2), a plurality of outwardly and downwardly extending fingers thereon, said ducts and baffles being so constructed and arranged that a first separation zone is created downwardly of the central portion of said baffle where relatively dense impurities may be separated from the cotton entrained on the air stream passing through said lower duct, and a second separation zone is created in the first and lower duct, said second separation zone being located in relatively less constricted portion of the lower duct, and wherein said relatively less dense impurities are separated from the remainder of the cotton entrained on said air stream, and wherein said cotton deflector means can deflect the said cotton without substantially deflecting said air stream.

2. An apparatus as defined in claim 1 in which said baffle means comprises a corrugated sheet member which is adapted to contact said cotton material and relatively dense impurities directed against said member and deflect said relatively dense impurities downwardly into the bottom of said lower duct.

3. An apparatus as defined in claim 1 in which said baffle member comprises a smooth curvilinear member which is adapted to contact cotton and other impurities associated therewith directed tangentially against said baffle whereby said relatively dense impurities are deflected downwardly and thus are separated from the cotton material entrained on said air stream.

4. A combination elevator extension and separator apparatus suitable for attachment to the discharge end of a cotton elevator wherein said elevator includes mechanical conveyor means and means for providing a cotton-entraining air stream, and for separating both relatively more dense and relatively less dense impurities from freshly harvested cotton, said apparatus comprising, in combination, duct means defining an enclosed first separation zone wherein said relatively dense impurities are separated from cotton discharged from the mechanical conveyor and entrained into the air stream, said duct means including means in the form of a baffle plate for separating impurities by a mechanical deflection downward when said dense impurities are thrown against said baffle plate, and duct means defining a second separation zone for separation of relatively less dense impurities, said second zone including means for creating a higher velocity region of low turbulence and lower air velocity region of greater turbulence in said second zone, and a third zone from which said thus purified cotton is discharged.

5. An apparatus as defined in claim 4 in which said baffle plate is a corrugated plate and in which the said cotton and impurities are directed relatively upwardly against said baffle before said separation of said relatively more dense impurities.

6. An apparatus as defined in claim 4 wherein said baffle means comprises a downwardly and rearwardly extending curvilinear member and in which said cotton and said impurities are directed relatively downwardly and tangentially at said baffle prior to said separation.

7. An apparatus as defined in claim 4 which includes upper discharge duct means for directing said air stream, and contained in said upper duct, deflector means comprising a plurality of downwardly movable fingers for changing the direction of said entrained cotton without substantially changing the direction of said air stream.

8. An apparatus as defined in claim 5 which includes an upper discharge duct for directing said air stream, and contained in said upper duct, deflector means comprising a plurality of downwardly movable fingers for changing the direction of travel of said cotton without substantially changing the direction of said air stream.

9. An apparatus as defined in claim 6 which includes an upper discharge duct for directing said air stream, and contained in said upper duct, deflector means comprising a base member and a plurality of fingers depending therefrom, whereby the direction of travel of said cotton may be changed without substantially changing the direction of said air stream.

10. An apparatus as defined in claim 1 wherein said lower duct includes an upwardly and outwardly extending flexible plate therein and attached to the top surface of said lower duct and is adapted to slidably engage the upper portion of said upper duct, whereby a relatively smooth curvilinear transition surface is provided between said lower duct and said upper duct.

11. An apparatus as defined in claim 1 which includes a retainer flange attached to and extending upwardly from the bottom wall portion of said lower duct member adjacent the rearward end of said lower duct member.

References Cited by the Examiner
UNITED STATES PATENTS

| | | | |
|---|---|---|---|
| 2,645,821 | 7/1953 | Fowler | 209—137 |
| 2,668,330 | 2/1954 | Gieszl | 56—12 X |
| 2,791,001 | 5/1957 | Roscoe et al. | 209—137 |
| 2,807,925 | 10/1957 | Andrews | 56—12 |
| 2,861,298 | 11/1958 | Fowler | 56—12 X |
| 3,086,533 | 4/1963 | Tonton | 209—136 X |

M. HENSON WOOD, JR., *Primary Examiner.*

A. N. KNOWLES, *Assistant Examiner.*